United States Patent [19]

Bidwell

[11] Patent Number: 4,774,810
[45] Date of Patent: Oct. 4, 1988

[54] METHOD OF AND APPARATUS FOR IMPROVING THE EFFICIENCY OF INTERNAL COMBUSTION ENGINES

[75] Inventor: Howard Bidwell, Granby, Mass.

[73] Assignee: Stephen Masiuk, Granby, Mass.

[21] Appl. No.: 121,055

[22] Filed: Nov. 16, 1987

Related U.S. Application Data

[60] Division of Ser. No. 5,023, Jan. 20, 1987, which is a continuation-in-part of Ser. No. 874,491, Jun. 16, 1986, which is a continuation-in-part of Ser. No. 821,342, Jan. 22, 1986, which is a continuation-in-part of Ser. No. 623,499, Jun. 22, 1984, abandoned, which is a continuation-in-part of Ser. No. 402,970, Jul. 29, 1982, Pat. No. 4,484,444.

[51] Int. Cl.$^4$ .............................................. F02B 37/00
[52] U.S. Cl. ..................... 60/605.1; 60/274; 60/280; 60/606; 60/611
[58] Field of Search ............... 60/274, 280, 600, 601, 60/605, 606, 611

[56] References Cited

U.S. PATENT DOCUMENTS

| | | | |
|---|---|---|---|
| 1,583,621 | 5/1926 | Steinberg | 60/280 |
| 3,059,415 | 10/1962 | Birmann | 417/406 |
| 3,311,097 | 3/1967 | Mittelstaedt | 60/275 |
| 3,798,906 | 3/1974 | Woollenweber | 60/280 |
| 4,227,372 | 10/1980 | Kakimoto | 60/611 |
| 4,512,153 | 4/1985 | Kawabata | 60/611 |

FOREIGN PATENT DOCUMENTS 2064656  6/1981  United Kingdom ............... 417/406

Primary Examiner—Douglas Hart
Attorney, Agent, or Firm—Ross, Ross & Flavin

[57] ABSTRACT

An arrangement of interrelated automatically responsive accesories for an Otto type internal combustion engine wherein an exhaust driven turbine rotor housing is directly connected to the engine exhaust manifold outlet, with the full exhaust flame kinetic energies impinging with full maximum velocity-thrust force against the turbine rotor vaning, at a flow rate variously intensified by the volumes of oxygen and hydrogen gases being fed to the engine intake in accordance to engine speed and load conditions may determine.

4 Claims, 3 Drawing Sheets

METHOD OF AND APPARATUS FOR IMPROVING THE EFFICIENCY OF INTERNAL COMBUSTION ENGINES

CROSS REFERENCES TO RELATED APPLICATIONS

This invention is a division of application Ser. No. 07/005,023, filed Jan. 20, 1987, pending, which is a continuation-in-part of application, Ser. No. 06/874,491, filed June 16, 1986 pending, which is a continuation-in-part of application, Ser. No. 06/821,342 pending, filed Jan. 22, 1986, which is a continuation-in-part of application, Ser. No. 623,499, now abandoned filed June 22, 1984, which was a continuation-in-part of application, Ser. No. 402,970 filed July 29, 1982, now U.S. Pat. No. 4,484,444, of Nov. 27, 1984.

BACKGROUND OF THE INVENTION

1. Field of the Invention

The invention teaches a method and apparatus for automatically controlling a properly-sequenced series of chain-action events within a single system involving a multiplicity of interrelated and interconnected components.

By such system, the pressure and volume of flow of a supercharged carbureted air/fuel mixture to the intake manifold of an Otto type internal combustion engine is selectively varied in accordance with the amounts of hydrogen and oxygen gases generated within a hydrogen-oxygen gas generator and selectively and separately fed to the engine intake and/or to the engine exhaust manifold.

An electric D.C. current generator is mounted on and driven by a hollow, air cooled drive shaft to which an engine exhaust flame driven turbine rotor is secured. By such means, the electric generator automatically feeds electric current directly to a gas generator, without the need for any switching or other controlling devices.

The gas generator is automatically responsive to energization received from the electric generator which is a special type of low voltage, high amperage generator, designed for this particular service exclusively.

The electric current is directed through a suitable electrical induction solenoid coil before reaching the gas generator. Its intensity or amperage may be such as to cause the armature within the solenoid coil to vary its position in response to that strength or amperage. The altering of the position of the armature is exploited via a mechanical linkage to actuate the shutter position of a butterfly type bypass valve located between the inlet and outlet of a supercharger.

This arrangement allows the automatic control of the amount of carbureted air/fuel/mixture fed to the intake manifold in consonance with the amount of hydrogen automatically fed alone, or the amounts of hydrogen and oxygen automatically fed unisonly, to the intake, free of any regulating devices save for the usual throttle means for accommodating to the various engine speed and load conditions.

Advantageously, this arrangement is achievable without any dictate for change in the conventional carburetor and liquid type fuel supply systems or engine speed governing means.

2. Description of the Prior Art

No method or apparatus is known to exist for intensifying what I identify as the secondary combustion of an engine exhaust in combination with generating hydrogen-oxygen gases with which to improve the intake and/or exhaust mixtures.

SUMMARY OF THE INVENTION

The invention increases the overall efficiency of an internal combustion engine by reducing the polluting effects of the engine exhaust through burning its non-consumed hydrocarbon content as augmented by the introduction of auxiliary fresh air into the exhaust flame, while simultaneously propelling the electric generator for energizing the gas generator with which to enrich the engine air-fuel intake mixture as well as the engine exhaust gas content.

Stated in another way, my invention provides for variously regulating, automatically, the opening of a bypass valve in a bypass duct between a supercharger inlet and outlet, in accordance with the volume of gas generated in the gas generator, as directed and consumed by the engine intake, same in turn being in accordance with the flow rate of the electric current amperage to the gas generator as indicated by an ampere detecting device and also by a solenoid responsive to a cooperant mechanical linkage with the bypass valve so that, as the exhaust turbine rotor speed varies, the speed of the exhaust turbine rotor driven electric generator also varies, all responsive to the engine's throttled speed.

Included is a means for heating and regulating the temperature of a hydrogen-oxygen gas generator electrolyte fluid, to a selected temperature, through heat extracted from the engine exhaust via an exhaust type heat exchanger, including a separate electrolyte conduit circulating circuit, fitted with a circulating pump, and an adjustable temperature control, so as to increase the gas generating capacity of the hydrogen-oxygen gas generator by what would otherwise be wasted exhaust heat.

The construction further utilizes the effective reactionary vaning of the rotor and stator, not shown, of any type during the expanding gases of an induced secondary combustion activity resulting from a continuous flow of the super-heated auxiliary fresh air being constantly directed into the exhaust flame which is maximized throughout most of the rotor travel between the exhaust flame inlet to the outlet.

DESCRIPTION OF THE PREFERRED EMBODIMENT

Figures 1, 2:
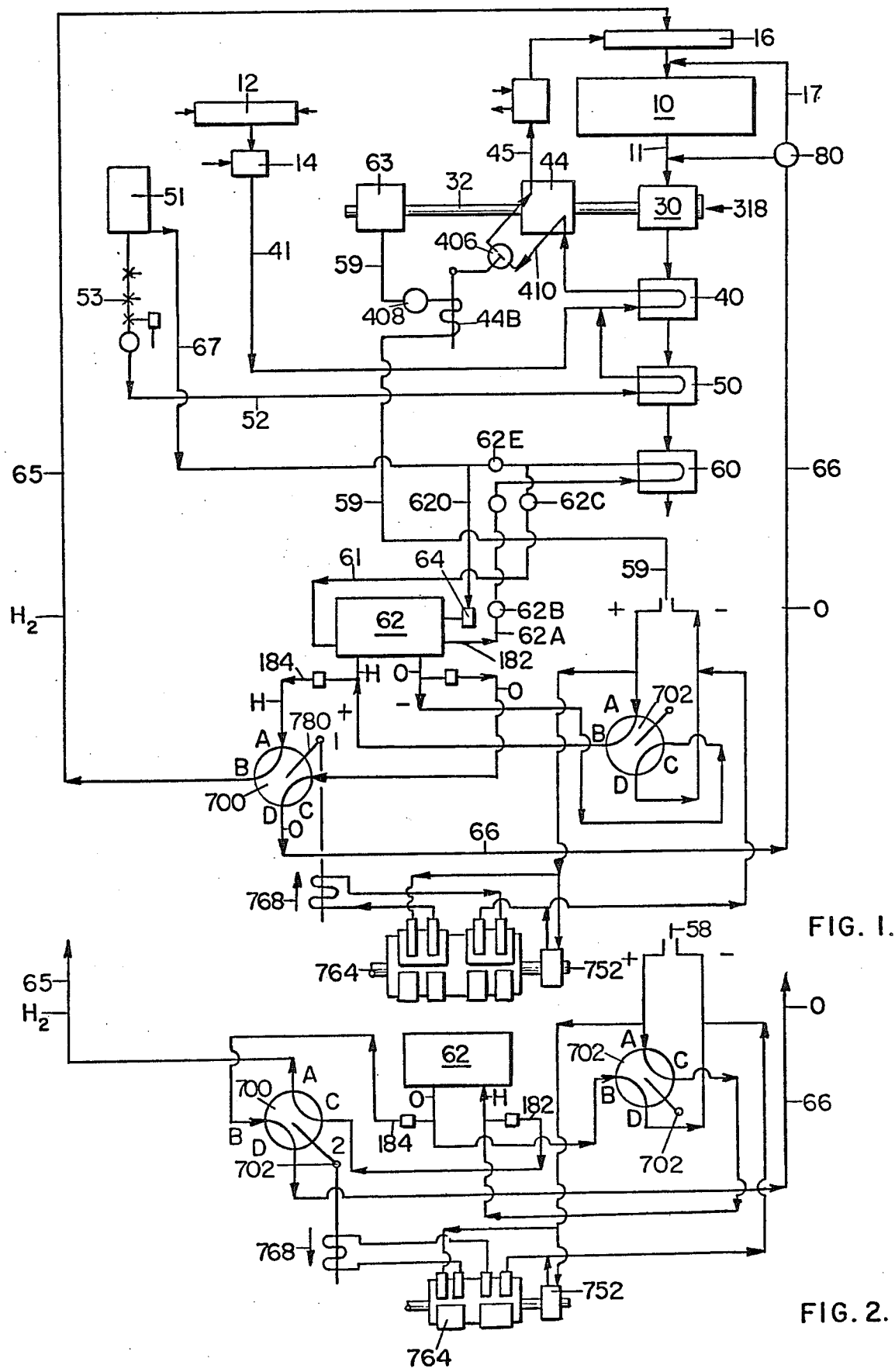
FIG. 1 is a schematic flow line diagram showing the various operatively interconnected components illustrating the basic principles of the invention.
FIG. 2 is a schematic flow line diagram showing the reversed positions of polarity of the electrodes.

In the schematic flow line diagram of FIG. 1, the exhaust from the exhaust manifold outlet of an internal combustion engine 10 is directed on to an air-cooled, exhaust-driven, turbine rotor within component 30, the exhaust flame impinging directly against the vaning of the rotor and imparting a rotative motion thereto.

The air-fuel mixture to the intake of engine 10 is drawn from an air filter 12 and cooperant carburetor 14, via a line 41, through a heat exchanger 40 to a supercharger 44, passing therefrom, via a line 45, to an intake manifold 16 of engine 10.

The carbureted air-fuel mixture delivered to the intake is thus heat conditioned by means of heat exchanger 40 from which it is drawn through the inlet of supercharger 44 by virtue of the drive shaft rotation, being then forced outwardly of the supercharger outlet, through a cooler, if one is provided, and thence to the intake manifold.

A water-alcohol solution is trickled from a reservoir 51, via a conduit 52, along which controls 53 are disposed, for regulating the flow in seriatim through a heat exchanger 50, heat exchanger 40, and supercharger 44 where the solution is converted to superheated steam.

Controls 53 will be automatically activated to open position, upon switching the vehicle ignition to on position, automatically returning to off position when the ignition is turned off.

Supercharger 44, and an electric generator 63 coaxial therewith, are driven jointly by an air-cooled drive shaft 32 of rotor 30.

Current from electric generator 63 is supplied, via a line 59, to an hydrogen-oxygen gas generator 62 for the generation of hydrogen and oxygen gases, the hydrogen gas being delivered to the intake manifold through a conduit 65 and the oxygen gas being delivered selectively through a conduit 66 directly into the exhaust flame and/or through a conduit 17 to a position between the intake manifold and the engine according to the setting of a distribution valve 80.

As more hydrogen and oxygen gases are fed to the engine, less carbureted air-fuel mixture from carburetor 14 is demanded. The flow thereof is regulated by virtue of a bypass valve 406 at supercharger 44 FIG. 1 and 27 FIG. 4 in accordance with the electric current amperage flow rate through an ammeter 408 and a solenoid 44B to gas generator 62.

Liquid flow from reservoir 51, via a conduit 67, is directed to a heat exchanger 60 and then, also via a conduit 620 to gas generator 62 as controlled by a liquid level controller 64 located adjacent the gas generator for controlling its electrolyte level.

Included is a means 62C for selectively heating and maintaining the electrolyte temperature, through heat extracted from the engine exhaust by way of heat exchanger 60 in seriatim. The arrangement calls for a separate electrolyte recirculating circuit 62A fitted with a circulating pump 62B and a sight feed glass and thence to the adjustable temperature regulator 62C in a return loop independent of electrolyte feed line level control with a one way check valve 62E in electrolyte feed line 67 between the level control line and the electrolyte recirculating line takeoff, all so as to attain an increased gas generating capacity by what would otherwise be wasted heat emanating from the exhaust.

The electric current is directed through a suitable electrical induction solenoid coil 44B before reaching the gas generator, and its intensity or amperage may be such as to cause the armature within the solenoid coil to vary its position in response to that strength or amperage. The altering of the armature position is exploited via the mechanical linkage 406 to actuate the shutter position of a butterfly type bypass valve located between the inlet and outlet of the supercharger 44.

This arrangement allows the automatic control of the amount of carbureted air/fuel/mixture fed to the intake manifold in consonance with the amount of hydrogen automatically fed alone, or the amounts of hydrogen and oxygen automatically fed unisonly, to the intake, free of any regulating devices save for the usual throttle means for accommodating to the various engine speed and load conditions.

Advantageously, this arrangement is achievable without any dictate for change in the conventional carburetor and liquid type fuel supply systems or engine speed governing means Secondary combustion activity is created within turbine 30 under the high operating temperature as auxiliary air is continuously fed directly into the engine exhaust flame.

I also provide a means for directing a flow of water from reservoir 51, or water and alcohol in combination in case of a freezing temperature, via conduit 52 to heat exchangers 50 and 40, in series therewith, and thence to supercharger 44 for changing the fluid from a vapor state to a true steam state for aiding the converting of the carbureted air-fuel mixture from a vapor to a gaseous state prior to entering the engine intake. This is to allow a more complete in-cylinder flamability.

Further with reference to FIG. 1, I show one of the positions of polarity of the electrodes feeding current to the gas generator.

A reversal of this polarity to a second position is desired in order to intermittently free the electrodes from the gas bubbles collecting thereon and is accomplished by the slow rotation of a switch 764 driven by a motor 752. The armature of a solenoid 768 is caused to reverse positions between what I identify as positions 1 and 2 due to the reverse in current flow direction.

Through a suitable mechanical linkage, the position of both a 4-way valve 700 and a rotating electric switch 702 are changed from one position and held at the other position until the next timed reversal takes place. In the meantime, as in FIG. 2 a positive current from a feed cable 59 is caused to flow to rotatable switch 702 terminal A thence to terminal C, thence to gas generator 62 manifold 182, thence via the series of cell electrodes and electrolyte within the generator to exterior manifold 184, thence to rotationable electric switch terminal B to terminal D thence to negative (−) conductor of the cable 59, causing hydrogen gas to flow from gas generator manifold 182 to 4-way valve port C and out port A to hydrogen gas line 65 while simultaneously causing oxygen gas to flow from gas generator manifold 184 to 4-way valve port B thence out port D, thence to oxygen line 66, thereby maintaining the flow of one type gas flow in each separate gas line during the repeated polarity changes in electric current flow to the gas generator 62, all by virtue of the electric current fed through the separate circuit wherein the electric current energizing solenoid coil 768 is periodically reversed by a slow revolving reversing drum switch 764, driven by slow speed gearhead motor 752. This causes a periodic reversal of the electric current flowing through solenoid coil 768 and its armature mechanically linked to positioning lever 780 on the rotation of cylinder switch 764 from one position to the other.

In FIG. 1, I show the second position of polarity of the electrodes feeding the current to gas generator 62.

Figure 3:
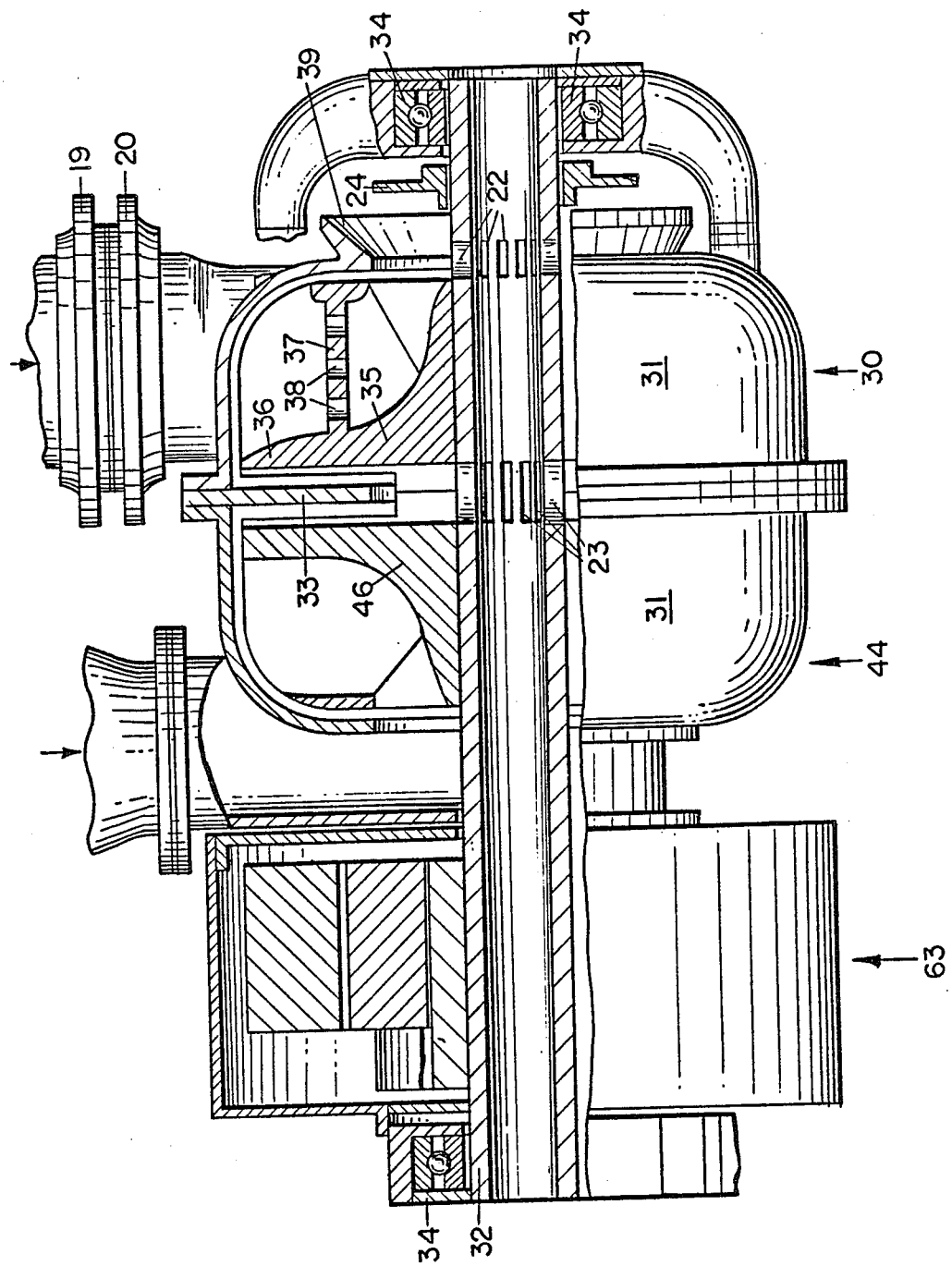
FIG. 3 is a part-sectional view on line 3—3 of FIG. 4.
Figure 4:
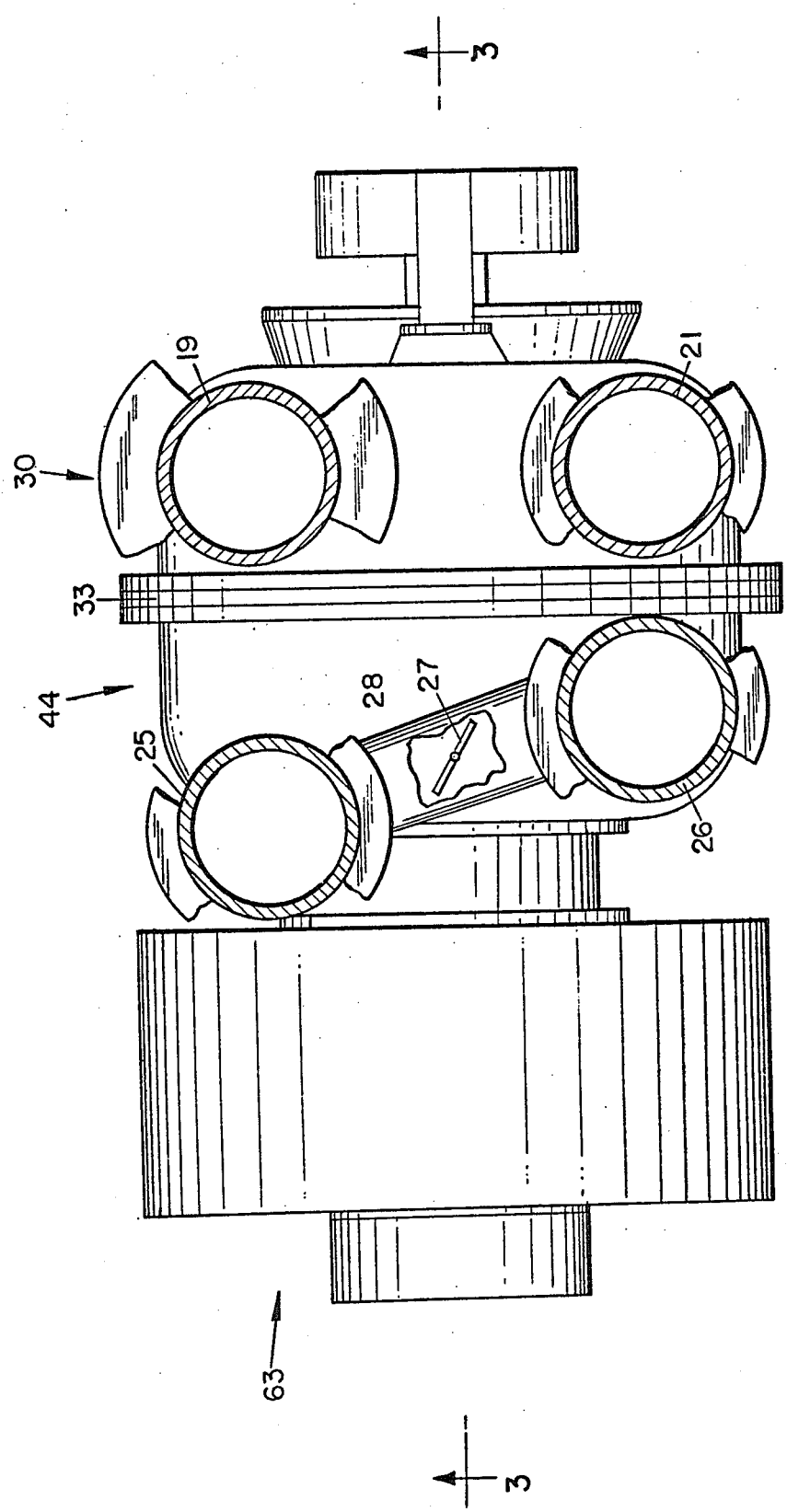
FIG. 4 is a view in top plan of the FIG. 3 showing illustrating the relative arrangement of the by-pass valve in part with other components.

In FIGS. 3 and 4, I have shown the FIG. 1 an original type turbine 30, supercharger 44 and electric generator 63 as combined into a unitary structure, the components being disposed in a side-by-side, or back-to-back arrangement.

Drive shaft 32 is supported by bearings 34 outboard of its opposite ends and has unobstructed air entrance openings at each end to allow the admission of ambient air thereinto.

Drive shaft 32, of hollow air-cooled design, is shown disposed in paralleism with the crankshaft of the engine. Exhaust driven turbine rotor is fixed thereto.

An intake supercharger rotor 46 is also mounted on the drive shaft in a back-to-back relationship with rotor 30, the two rotors being housed within a housing 31 and separated by a common plate 33 disposed between housing half parts.

The rotor has outer vaning 36 and inner vaning 35 separated from each other by a cylinderical shell 37 provided with through perforations 38.

The exhaust flame impinges directly against outer vaning 36, rotating the rotor at a high velocity within the flame. Inner vaning 35 draws fresh air through an air inlet 39 which air is agitated and heat conditioned by the inner vaning before being charged through perforations 38 for blending with the exhaust flame and for travel through the U-shaped route to the housing discharge outlet 21.

Operationally, the exhaust flame from exhaust manifold outlet 19 enters exhaust rotor housing inlet 20 so as to impinge the flame with a thrust against the outer vaning 36, FIG. 4, causing the rotor within component 30 to rotate along with the rotor of supercharger 44, and causing electric generator 63 to rotate, with the generated current flowing to the gas generator 62.

The exhaust flow follows a U-shaped course toward a discharge outlet 21.

The blending results in a secondary combustion activity for the burning of any non-burned hydrocarbons in the exhaust gases. And all at the same time the various parts of the rotor are kept from excessive heating, it being cooled in part by the air currents drawn into the housing via a series of peripherally-arranged air ports 22 in the drive shaft. Other air ports 23 in the drive shaft allow a cooling of the back vaning 35 and 46 on the respective backsides of the two rotors further aiding the blending of the fresh air in the exhaust flame.

The fresh air being introduced via inlet 39 to the turbine rotor initially flowing over the outer vaning surfaces while being blended into the flame due to the rotor rotation, helps to avoid a lowering of the exhaust flame temperature so as not to degrade the secondary combustion activity. Yet it is sufficient enough to increase the propelling force on the outer vaning so as to generate additional energy.

The charge of fresh air admitted to the turbine is controllable by a slidable shutter 24 mounted on the drive shaft 32 (FIG. 3).

Means is also provided for by-passing of a portion of the supercharged carbureted air-fuel mixture so as to reduce the air fuel volume flow from carburetor 14, during periods when the hydrogen and oxygen gases are being fed to engine intake 16 or otherwise distributed.

Intake supercharger inlet 25 receives the air-fuel mixture from conduit 41 (FIG. 1) which is then accelerated in its passage through the supercharger by virtue of the supercharger vaning before its discharge via supercharger outlet 26 (FIG. 4).

Between inlet 25 and outlet 26, a butterfly type bypass valve 27 (FIG. 4) is disposed as 406 (FIG. 1).

Bypass valve 27 in a bypass duct 28 between outlet 26 and inlet 25 (FIG. 4) of the supercharger serves as the automatic means for regulating the volume of supercharged air-fuel mixture bypassed through the bypass duct.

This in turn controls the volume of air-fuel mixture drawn from the carburetor.

Bypass valve 27 may be automatically positioned in accordance with the rate of electrical current generated by electric generator 63, as propelled by the turbine and the corresponding volume of the gas or gases generated in gas generator 62 and fed automatically to the engine (FIG. 1).

This in turn determines the need for more or less carbureted air-fuel mixture in accordance to volume of hydrogen gas fed to engine intake under varying load conditions.

This controls the positioning of the armature respective to current flow volume as such energizes the solenoid. An increase or decrease in the amperage flow through the solenoid causes the solenoid to actuate the linkage so as to position bypass valve 406 (FIG. 1) to open the bypass responsively to the amperage fed to the gas generator by which the more hydrogen and oxygen fed to the engine, the less air fuel mixture flow needed.

With the engine operational, hydrogen gas within the generator flows to the engine intake manifold, free of any flow regulating controls or devices and at a rate in accordance with the engine speed. Simultaneously, the oxygen gas freely flows to the engine exhaust manifold. During idling or at no-load speeds, the hydrogen and oxygen generating rates are reduced responsively to the low electric current flow from the electric generator, also operating at that speed.

The outside fresh auxiliary air drawn into the rotor by the inner vaning is vigorously agitated and heat conditioned prior to being forced through the perforations of the rotor inner chamber so as to be uniformly distributed among the various vanes of the outer rotor vaning, and directly into the high temperature exhaust flame blast. This excites an increased additional secondary combustion activity and results in an increased gas volume expansion and velocity thrust force against the rotor outer vaning. Simultaneously the unburned hydrocarbons are burned so as to increase the carbon dioxide content.

The operation is fully automatic without any need for regulating controls since gas generation does not begin until the engine exhaust has reached an intensity sufficient to drive the electric generator at a speed sufficient to generate an electric current of a wattage for operating the hydrogen-oxygen gas generator at a capacity rate in direct relationship with the engine load-speed operation.

I claim:

1. Fluid motor means driven by exhaust energy directly from an internal combustion engine manifold outlet including:
   a turbine and supercharger and electric generator axially mounted on a drive shaft,
   the turbine transferring the energy from the engine exhaust to a motive fluid for rotating the drive shaft of the supercharger and electric generator,
   a source of an air/fuel mixture for delivery to the supercharger,
   a gas generator automatically energized by the total electric generator output exclusively upon the rotation thereof, an induction solenoid coil in the power line between the electric and gas generators with a solenoid armature being shiftable responsively to the amperage of the current in the power line to the gas generator, a valved by-pass disposed between the inlet and outlet of the supercharger, a mechanical linkage between the armature and a valve of the by-pass, with the air/fuel mixture fed to the engine being automatically variable according to the quantities of oxygen and hydrogen fed to the engine intake and with the pressure and volume of the air/fuel mixture flowing from the supercharger to the engine being at a rate in consonance with the separate selected flow of oxygen and hydrogen to the engine intake.

2. In an internal combustion engine having an exhaust driven turbine, the improvement in apparatus for automatically controlling a sequenced series of events involving a plurality of interrelated components including:

a supercharger driven by the turbine, a valved by-pass within the supercharger between the inlet and outlet thereof, an electric generator driven by the turbine, means for creating an variable air/fuel mixture for delivery from the supercharger to the engine, means for trickling water to the supercharger for conversion into super heated steam for facilitating the converting of the air/fuel mixture to a gaseous state, a gas generator energized by the electric generator for creating supplies of hydrogen and oxygen gases with the hydrogen gas being separately delivered to the engine intake and with the oxygen gas being separately delivered to the exhaust turbine inlet, an ammeter and solenoid in the current line extending from the electric generator to the gas generator, a mechanical linkage operated by the solenoid and connected to a valve in the by-pass for actuating the valve and therewith controlling the amount of the air/fuel mixture fed to the engine in consonance with the volume of hydrogen and oxygen fed to the engine, the above-recited elements being adapted and arranged foir lessing the floe of air/fuel mixture to the engine as the charges of hydrogen and oxygen gases are increased as regulated by the valve in the by-pass in the supercharger responsively to the current flow from the electric generator to the gas generator.

3. In an internal combustion engine including an exhaust propelled system for carrying exhaust fluid from the engine and a turbine adapted to utilize energy in the exhaust fluid, wherein the improvement comprises:

a source of an air/fuel mixture, a supercharger connected with the exhaust propelled system and adapted to utilize energy in the exhaust fluid for increasing the pressure of the air/fuel mixture delivered from the source to the supercharger, an electric generator driven by the exhaust system, a gas generator energized by the electric generator for generating hydrogen and oxygen gases, delivery means for separately delivering hydrogen and oxygen gases to the engine, delivery means for delivering the air/fuel mixture from the supercharger to the engine for reaction with the hydrogen and oxygen gases, a valved bypass in the supercharger connected with the supercharger inlet and outlet with a valve in the bypass being mechanically and electrically responsive to the amperage value flow in the power line between the electric and gas generators.

4. In a multi-component interconnected automatic-responsive internal combustion engine waste heat reclamation system, comprising the steps:

automatically feeding hydrogen gas to the engine intake for reducing the volume of the carbureted liquid fuel/air mixture intake in consonance with feeding oxygen gas selectively as allowed by the increased maximum extracting of velocity and heat energies, boosted in part by a selected variable quantity volume flow of oxygen gas enriched engine exhaust jet expanded directly against vaning of an exhaust driven auxiliary air inducing and heat conditioning rotor, the rotor in turn propelling a supercharger rotor and a direct connected low voltage high amperage D.C. electric generator for respectively supercharging the engine intake content and energizing a hydrogen-oxygen gas generator, altering the engine intake content while simultaneously altering the exhaust content by increasing the exhaust velocity thrust against the rotor vaning, simultaneously blending heat conditioned auxiliary air directly into the exhaust for additionally increasing the secondary combustion activity within the exhaust turbine rotor and thereby obtaining additional thrust against the rotor vaning while consuming the unburned hydrocarbons to a maximum $CO_2$ content.

* * * * *